UNITED STATES PATENT OFFICE.

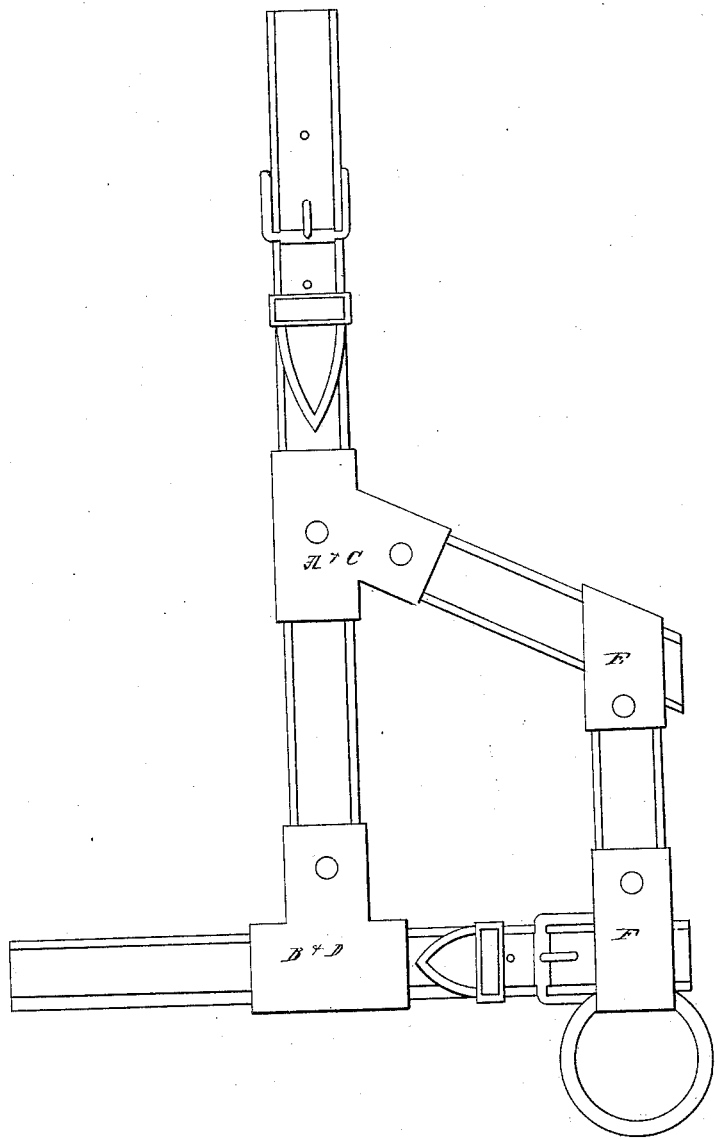

HIRAM B. WARE, OF BURLINGTON, IOWA.

IMPROVED MODE OF MANUFACTURING HALTERS.

Specification forming part of Letters Patent No. 49,939, dated September 12, 1865.

*To all whom it may concern:*

Be it known that I, HIRAM B. WARE, of Burlington, in the county of Des Moines and State of Iowa, have invented a new and useful Improvement in Halters; and I do hereby declare that the following is a full and exact description of the said invention.

The nature of my invention consists in using metallic slides instead of rings on the noseband, cheek-pieces, throat-latch, and throat-strap, which are marked on the drawing herewith inclosed as follows, to wit:

A and C consist of a slide of malleable iron inclosing the cheek-pieces, also the throat-latch, at the proper angle—say, about seventy degrees.

B and D consist each of a T-slide of the same material inclosing the lower end of the cheek-pieces and the nose-band at right angles.

E and F are straight slides of the same material, E inclosing the throat-latch and the upper end of the throat-strap and F inclosing the lower end of the throat-strap with the nose-band passing through it at right angles, all the necessary fastenings on said slides to be rivets, as shown in the accompanying drawing.

What I claim in my invention is—

A halter made with clasps and rivets, substantially as herein shown and described.

H. B. WARE.

Witnesses:
  C. MARBLE,
  WILLIAM H. STARR.